United States Patent
Jain et al.

(10) Patent No.: US 11,736,990 B2
(45) Date of Patent: Aug. 22, 2023

(54) TECHNIQUES FOR UPLINK PERFORMANCE OPTIMIZATION IN DUAL CARRIER OPERATION

(71) Applicant: QUALCOMM Incorporated, San Diego, CA (US)

(72) Inventors: Sachin Jain, Santa Clara, CA (US); Sridhar Bandaru, Westminster, CO (US); Bhupesh Manoharlal Umatt, Poway, CA (US); Thawatt Gopal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,472

(22) Filed: Jan. 26, 2021

(65) Prior Publication Data
US 2022/0030479 A1 Jan. 27, 2022

Related U.S. Application Data

(60) Provisional application No. 62/705,900, filed on Jul. 21, 2020.

(51) Int. Cl.
*H04W 36/06* (2009.01)
*H04W 36/00* (2009.01)
*H04W 76/16* (2018.01)

(52) U.S. Cl.
CPC . *H04W 36/0069* (2018.08); *H04W 36/00837* (2018.08); *H04W 36/06* (2013.01); *H04W 76/16* (2018.02)

(58) Field of Classification Search
CPC . H04W 36/0069; H04W 36/06; H04W 76/16; H04W 36/00837
See application file for complete search history.

(56) References Cited

U.S. PATENT DOCUMENTS

| | | | |
|---|---|---|---|
| 2009/0041151 A1* | 2/2009 | Khan | H04L 5/0023 375/267 |
| 2011/0096815 A1* | 4/2011 | Shin | H04B 7/0689 375/219 |

(Continued)

FOREIGN PATENT DOCUMENTS

| | | |
|---|---|---|
| EP | 3188370 A2 | 7/2017 |
| WO | WO-2017124327 A1 | 7/2017 |

OTHER PUBLICATIONS

International Search Report and Written Opinion—PCT/US2021/070746—ISA/EPO—dated Oct. 12, 2021.

*Primary Examiner* — Hassan A Phillips
*Assistant Examiner* — Prenell P Jones
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may communicate on a primary carrier using a first antenna port. The UE may communicate on a secondary carrier using a second antenna port. The UE may determine whether to switch the secondary carrier from the second antenna port to the first antenna port based on a channel condition associated with the second antenna port. The UE may switch the secondary carrier from the second antenna port to the first antenna port based on a determination to switch the secondary carrier from the second antenna port to the first antenna port. Numerous other aspects are provided.

21 Claims, 7 Drawing Sheets

(56) References Cited

U.S. PATENT DOCUMENTS

| | | | | |
|---|---|---|---|---|
| 2011/0243007 | A1* | 10/2011 | Xiao | H04W 52/20 |
| | | | | 370/252 |
| 2012/0294694 | A1* | 11/2012 | Garot | F27D 1/141 |
| | | | | 411/427 |
| 2013/0010964 | A1* | 1/2013 | Fong | H04L 5/0094 |
| | | | | 370/329 |
| 2014/0220902 | A1 | 8/2014 | Clevorn et al. | |
| 2016/0234752 | A1* | 8/2016 | Hsu | H04L 12/4641 |
| 2016/0285481 | A1* | 9/2016 | Cohen | H03F 1/02 |
| 2018/0020360 | A1* | 1/2018 | Yerramalli | H04B 1/713 |
| 2018/0110017 | A1* | 4/2018 | Jha | H04L 1/0011 |
| 2018/0220360 | A1* | 8/2018 | Sheng | H04L 27/2613 |
| 2018/0279274 | A1* | 9/2018 | Sun | H04W 72/04 |
| 2018/0375554 | A1* | 12/2018 | Faxér | H04B 7/0478 |
| 2019/0141647 | A1* | 5/2019 | Nimbalker | H04W 4/40 |
| 2019/0238302 | A1* | 8/2019 | Shin | H04W 52/32 |
| 2019/0261234 | A1* | 8/2019 | Park | H04W 36/0069 |
| 2019/0261279 | A1* | 8/2019 | Qi | H04W 52/16 |
| 2019/0268970 | A1* | 8/2019 | Chang | H04W 88/10 |
| 2019/0349066 | A1* | 11/2019 | Yang | H04L 5/005 |
| 2020/0068504 | A1* | 2/2020 | Yi | H04W 52/34 |
| 2020/0128564 | A1* | 4/2020 | Takeda | H04W 72/1268 |
| 2020/0267585 | A1* | 8/2020 | Menon | H04W 48/12 |
| 2020/0351818 | A1* | 11/2020 | Park | H04W 68/02 |
| 2021/0282143 | A1* | 9/2021 | Lee | H04W 52/281 |
| 2021/0288694 | A1* | 9/2021 | Frenger | H04L 5/0023 |
| 2021/0337486 | A1* | 10/2021 | Liu | H04L 5/0092 |

\* cited by examiner

TECHNIQUES FOR UPLINK PERFORMANCE OPTIMIZATION IN DUAL CARRIER OPERATION

CROSS-REFERENCE TO RELATED APPLICATION

This Patent application claims priority to U.S. Provisional Patent Application No. 62/705,900, filed on Jul. 21, 2020, entitled "TECHNIQUES FOR UPLINK PERFORMANCE OPTIMIZATION IN DUAL CARRIER OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink performance optimization in dual carrier operation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: communicating on a primary carrier using a first antenna port; communicating on a secondary carrier using a second antenna port; determining whether to switch the secondary carrier from the second antenna port to the first antenna port based on a channel condition associated with the second antenna port; and switching the secondary carrier from the second antenna port to the first antenna port based on a determination to switch the secondary carrier from the second antenna port to the first antenna port.

In some aspects, the method includes switching the primary carrier from the first antenna port to the second antenna port based on the determination to switch the secondary carrier from the second antenna port to the first antenna port.

In some aspects, the determination whether to switch the secondary carrier from the second antenna port to the first antenna port comprises: determining that the channel condition associated with the second antenna port satisfies a threshold for communicating using the primary carrier, and determining whether to switch the secondary carrier from the second antenna port to the first antenna port based on the determination that the channel condition associated with the second antenna port satisfies the threshold for communicating using the primary carrier.

In some aspects, the threshold is associated with at least one of: a block error rate associated with the second antenna port, a received signal strength indicator associated with the second antenna port, or a signal-to-noise ratio associated with the second antenna port.

In some aspects, the determination of whether to switch the secondary carrier from the second antenna port to the first antenna port is further based on a UE benefit associated with a switch of the secondary carrier from the second antenna port to the first antenna port.

In some aspects, the UE benefit is associated with at least one of improving transmit power, increasing throughput, or improving call sustainability.

In some aspects, the determination of whether to switch the secondary carrier from the second antenna port to the first antenna port is further based on information associated with resource allocations for the primary carrier and information associated with resource allocations for the secondary carrier.

In some aspects, the method includes determining, after the switching of the secondary carrier from the second antenna port to the first antenna port, whether to switch the secondary carrier from the first antenna port to the second antenna port based on another channel condition associated with the second antenna port, and switching the secondary carrier from the first antenna port to the second antenna port based on a determination to switch the secondary carrier from the first antenna port to the first antenna port.

In some aspects, the method includes switching the primary carrier from the second antenna port to the first antenna port based on the determination to switch the secondary carrier from the first antenna port to the second antenna port.

In some aspects, the determination of whether to switch the secondary carrier from the first antenna port to the second antenna port based on the other channel condition comprises: determining that the other channel condition associated with the second antenna port fails to satisfy a threshold for communicating using the primary carrier, and determining to switch the secondary carrier from the first antenna port to the second antenna port based on the determination that the other channel condition associated with the second antenna port fails to satisfy the threshold for communicating using the primary carrier.

In some aspects, the determination of whether to switch the secondary carrier from the first antenna port to the second antenna port is triggered based on expiration of a timer.

In some aspects, the determination of whether to switch the secondary carrier from the first antenna port to the second antenna port is triggered based on a detection of an event.

In some aspects, the UE is operating in a dual connectivity (DC) mode, the primary carrier is an anchor carrier associated with the DC mode, and the secondary carrier is a non-anchor carrier associated with the DC mode.

In some aspects, the primary carrier is an LTE carrier and the secondary carrier is an NR carrier.

In some aspects, the UE is operating in a dual subscriber identity module (SIM) dual active mode, the primary carrier is associated with a first SIM, and the secondary carrier is associated with a second SIM.

In some aspects, a UE for wireless communication includes a memory and one or more processors operatively coupled to the memory, the memory and the one or more processors configured to: communicate on a primary carrier using a first antenna port; communicate on a secondary carrier using a second antenna port; determine whether to switch the secondary carrier from the second antenna port to the first antenna port based on a channel condition associated with the second antenna port; and switch the secondary carrier from the second antenna port to the first antenna port based on a determination to switch the secondary carrier from the second antenna port to the first antenna port.

In some aspects, the one or more processors are further configured to switch the primary carrier from the first antenna port to the second antenna port based on the determination to switch the secondary carrier from the second antenna port to the first antenna port.

In some aspects, the one or more processors are configured to, when determining whether to switch the secondary carrier from the second antenna port to the first antenna port: determine that the channel condition associated with the second antenna port satisfies a threshold for communicating using the primary carrier, and determine whether to switch the secondary carrier from the second antenna port to the first antenna port based on the determination that the channel condition associated with the second antenna port satisfies the threshold for communicating using the primary carrier.

In some aspects, the threshold is associated with at least one of: a block error rate associated with the second antenna port, a received signal strength indicator associated with the second antenna port, or a signal-to-noise ratio associated with the second antenna port.

In some aspects, the determination of whether to switch the secondary carrier from the second antenna port to the first antenna port is further based on a UE benefit associated with a switch of the secondary carrier from the second antenna port to the first antenna port.

In some aspects, the UE benefit is associated with at least one of improving transmit power, increasing throughput, or improving call sustainability.

In some aspects, the determination of whether to switch the secondary carrier from the second antenna port to the first antenna port is further based on information associated with resource allocations for the primary carrier and information associated with resource allocations for the secondary carrier.

In some aspects, the one or more processors are further configured to: determine, after the switching of the secondary carrier from the second antenna port to the first antenna port, whether to switch the secondary carrier from the first antenna port to the second antenna port based on another channel condition associated with the second antenna port, and switch the secondary carrier from the first antenna port to the second antenna port based on a determination to switch the secondary carrier from the first antenna port to the first antenna port.

In some aspects, the one or more processors are further configured to switch the primary carrier from the second antenna port to the first antenna port based on the determination to switch the secondary carrier from the first antenna port to the second antenna port.

In some aspects, the one or more processors are configured to, when determining whether to switch the secondary carrier from the first antenna port to the second antenna port based on the other channel condition: determine that the other channel condition associated with the second antenna port fails to satisfy a threshold for communicating using the primary carrier, and determine to switch the secondary carrier from the first antenna port to the second antenna port based on the determination that the other channel condition associated with the second antenna port fails to satisfy the threshold for communicating using the primary carrier.

In some aspects, the determination of whether to switch the secondary carrier from the first antenna port to the second antenna port is triggered based on expiration of a timer.

In some aspects, the determination of whether to switch the secondary carrier from the first antenna port to the second antenna port is triggered based on a detection of an event.

In some aspects, the UE is operating in a DC mode, the primary carrier is an anchor carrier associated with the DC mode, and the secondary carrier is a non-anchor carrier associated with the DC mode.

In some aspects, the primary carrier is an LTE carrier and the secondary carrier is an NR carrier.

In some aspects, the UE is operating in a dual SIM dual active mode, the primary carrier is associated with a first SIM, and the secondary carrier is associated with a second SIM.

In some aspects, a non-transitory computer-readable medium storing one or more instructions for wireless communication includes one or more instructions that, when executed by one or more processors of a UE, cause the one or more processors to: communicate on a primary carrier using a first antenna port; communicate on a secondary carrier using a second antenna port; determine whether to switch the secondary carrier from the second antenna port to the first antenna port based on a channel condition associated with the second antenna port; and switch the secondary carrier from the second antenna port to the first antenna port based on a determination to switch the secondary carrier from the second antenna port to the first antenna port.

In some aspects, the one or more instructions, when executed by the one or more processors, further cause the one or more processors to switch the primary carrier from the first antenna port to the second antenna port based on the determination to switch the secondary carrier from the second antenna port to the first antenna port.

In some aspects, the one or more instructions, when causing the one or more processors to determine whether to switch the secondary carrier from the second antenna port to the first antenna port, cause the one or more processors to: determine that the channel condition associated with the second antenna port satisfies a threshold for communicating using the primary carrier, and determine whether to switch the secondary carrier from the second antenna port to the first antenna port based on the determination that the channel condition associated with the second antenna port satisfies the threshold for communicating using the primary carrier.

In some aspects, the threshold is associated with at least one of: a block error rate associated with the second antenna port, a received signal strength indicator associated with the second antenna port, or a signal-to-noise ratio associated with the second antenna port.

In some aspects, the determination of whether to switch the secondary carrier from the second antenna port to the first antenna port is further based on a UE benefit associated with a switch of the secondary carrier from the second antenna port to the first antenna port.

In some aspects, the UE benefit is associated with at least one of improving transmit power, increasing throughput, or improving call sustainability.

In some aspects, the determination of whether to switch the secondary carrier from the second antenna port to the first antenna port is further based on information associated with resource allocations for the primary carrier and information associated with resource allocations for the secondary carrier.

In some aspects, the one or more instructions, when executed by the one or more processors, further cause the one or more processors to: determine, after the switching of the secondary carrier from the second antenna port to the first antenna port, whether to switch the secondary carrier from the first antenna port to the second antenna port based on another channel condition associated with the second antenna port, and switch the secondary carrier from the first antenna port to the second antenna port based on a determination to switch the secondary carrier from the first antenna port to the first antenna port.

In some aspects, the one or more instructions, when executed by the one or more processors, further cause the one or more processors to switch the primary carrier from the second antenna port to the first antenna port based on the determination to switch the secondary carrier from the first antenna port to the second antenna port.

In some aspects, the one or more instructions, when causing the one or more processors to determine whether to switch the secondary carrier from the first antenna port to the second antenna port based on the other channel condition, cause the one or more processors to: determine that the other channel condition associated with the second antenna port fails to satisfy a threshold for communicating using the primary carrier, and determine to switch the secondary carrier from the first antenna port to the second antenna port based on the determination that the other channel condition associated with the second antenna port fails to satisfy the threshold for communicating using the primary carrier.

In some aspects, the determination of whether to switch the secondary carrier from the first antenna port to the second antenna port is triggered based on expiration of a timer.

In some aspects, the determination of whether to switch the secondary carrier from the first antenna port to the second antenna port is triggered based on a detection of an event.

In some aspects, the UE is operating in a DC mode, the primary carrier is an anchor carrier associated with the DC mode, and the secondary carrier is a non-anchor carrier associated with the DC mode.

In some aspects, the primary carrier is an LTE carrier and the secondary carrier is an NR carrier.

In some aspects, the UE is operating in a dual SIM dual active mode, the primary carrier is associated with a first SIM, and the secondary carrier is associated with a second SIM.

In some aspects, an apparatus for wireless communication includes: means for communicating on a primary carrier using a first antenna port; means for communicating on a secondary carrier using a second antenna port; means for determining whether to switch the secondary carrier from the second antenna port to the first antenna port based on a channel condition associated with the second antenna port; and means for switching the secondary carrier from the second antenna port to the first antenna port based on a determination to switch the secondary carrier from the second antenna port to the first antenna port.

In some aspects, the apparatus includes means for switching the primary carrier from the first antenna port to the second antenna port based on the determination to switch the secondary carrier from the second antenna port to the first antenna port.

In some aspects, the means for determining whether to switch the secondary carrier from the second antenna port to the first antenna port comprises: means for determining that the channel condition associated with the second antenna port satisfies a threshold for communicating using the primary carrier, and means for determining whether to switch the secondary carrier from the second antenna port to the first antenna port based on the determination that the channel condition associated with the second antenna port satisfies the threshold for communicating using the primary carrier.

In some aspects, the threshold is associated with at least one of: a block error rate associated with the second antenna port, a received signal strength indicator associated with the second antenna port, or a signal-to-noise ratio associated with the second antenna port.

In some aspects, the determination of whether to switch the secondary carrier from the second antenna port to the first antenna port is further based on a UE benefit associated with a switch of the secondary carrier from the second antenna port to the first antenna port.

In some aspects, the UE benefit is associated with at least one of improving transmit power, increasing throughput, or improving call sustainability.

In some aspects, the determination of whether to switch the secondary carrier from the second antenna port to the first antenna port is further based on information associated with resource allocations for the primary carrier and information associated with resource allocations for the secondary carrier.

In some aspects, the apparatus includes means for determining, after the switching of the secondary carrier from the second antenna port to the first antenna port, whether to switch the secondary carrier from the first antenna port to the second antenna port based on another channel condition associated with the second antenna port, and means for switching the secondary carrier from the first antenna port to the second antenna port based on a determination to switch the secondary carrier from the first antenna port to the first antenna port.

In some aspects, the apparatus includes means for switching the primary carrier from the second antenna port to the first antenna port based on the determination to switch the secondary carrier from the first antenna port to the second antenna port.

In some aspects, the means for determining whether to switch the secondary carrier from the first antenna port to the second antenna port based on the other channel condition comprises: means for determining that the other channel condition associated with the second antenna port fails to satisfy a threshold for communicating using the primary carrier, and means for determining to switch the secondary carrier from the first antenna port to the second antenna port based on the determination that the other channel condition associated with the second antenna port fails to satisfy the threshold for communicating using the primary carrier.

In some aspects, the determination of whether to switch the secondary carrier from the first antenna port to the second antenna port is triggered based on expiration of a timer.

In some aspects, the determination of whether to switch the secondary carrier from the first antenna port to the second antenna port is triggered based on a detection of an event.

In some aspects, the UE is operating in a DC mode, the primary carrier is an anchor carrier associated with the DC mode, and the secondary carrier is a non-anchor carrier associated with the DC mode.

In some aspects, the primary carrier is an LTE carrier and the secondary carrier is an NR carrier.

In some aspects, the UE is operating in a dual SIM dual active mode, the primary carrier is associated with a first SIM, and the secondary carrier is associated with a second SIM.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
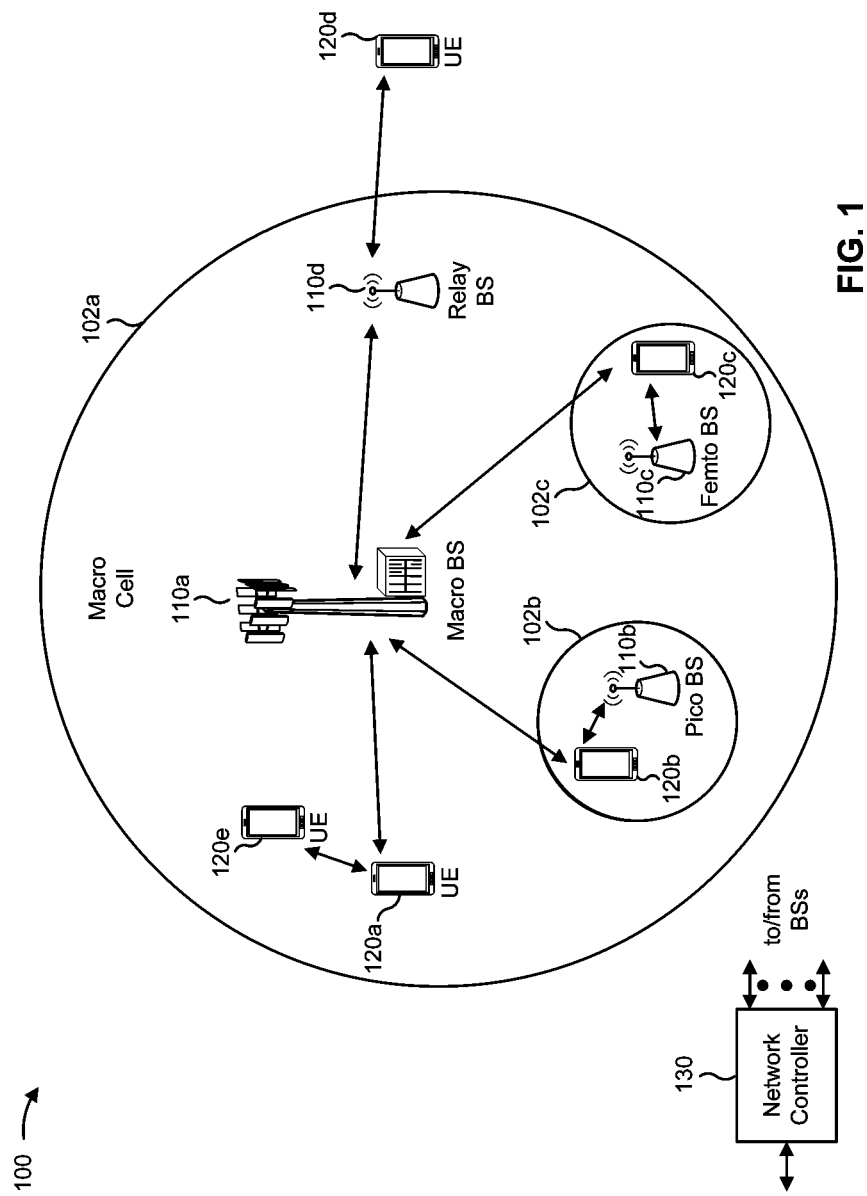
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
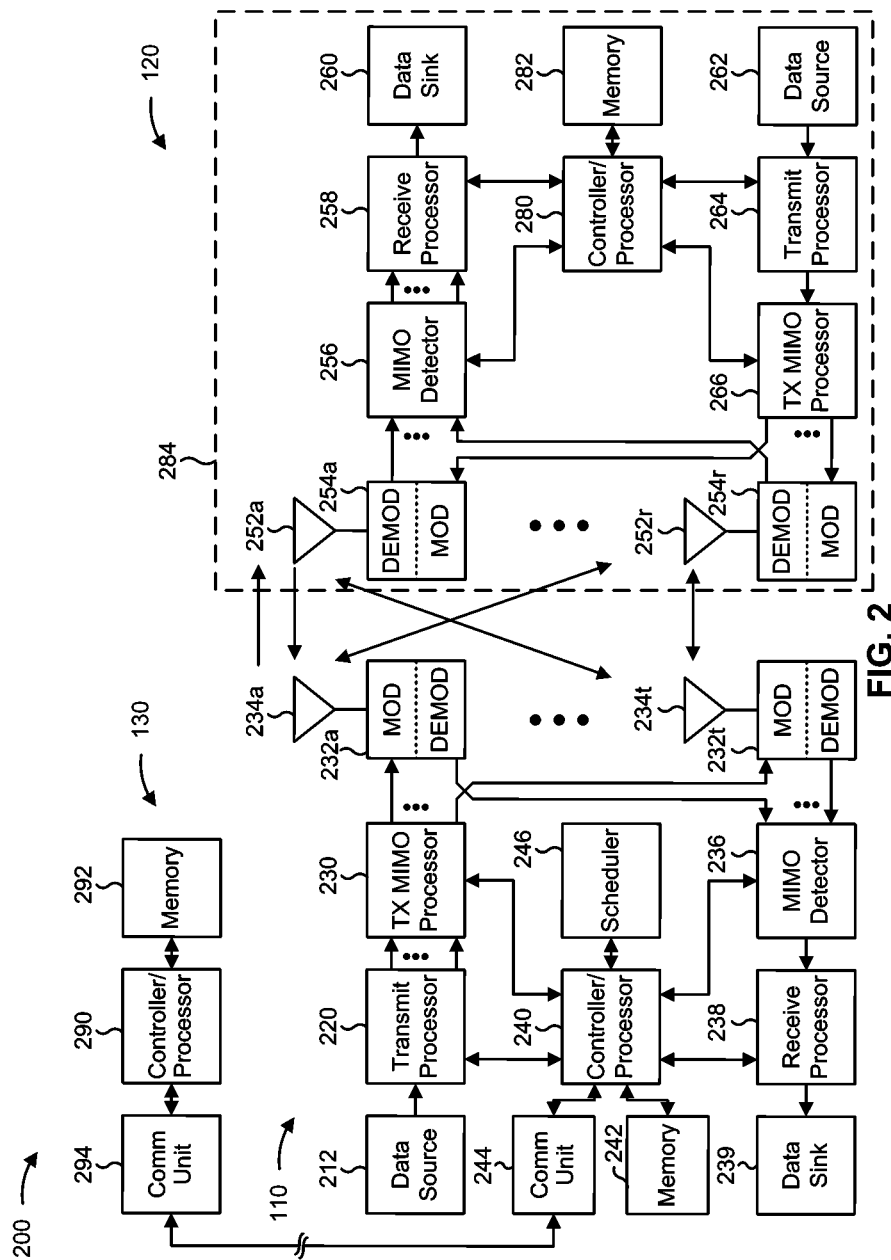
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with uplink performance optimization in dual carrier operation, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, interpreting the instructions, and/or the like.

In some aspects, UE 120 may include means for communicating on a primary carrier using a first antenna port; means for communicating on a secondary carrier using a second antenna port; means for determining whether to switch the secondary carrier from the second antenna port to the first antenna port based on a channel condition associated with the second antenna port; means for switching the secondary carrier from the second antenna port to the first antenna port based on a determination to switch the secondary carrier from the second antenna port to the first antenna port; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE (e.g., a UE 120) may be capable of operating in a mode that allows the UE to communicate using two frequency carriers simultaneously. Such a mode of operation is herein referred to as a dual carrier mode of operation or a dual connectivity mode of operation. Such a UE may, for example, communicate with a first base station (e.g., a first base station 110 associated with a first radio access technology (RAT)) using a first carrier, and may communicate with a second base station (e.g., a second base station 110 associated with the first RAT or a second RAT) using a second carrier.

A particular example of a dual carrier mode of operation is a so-called non-standalone (NSA) mode of operation in which the UE communicates using an anchor carrier and a non-anchor carrier. Typically, the anchor carrier supports control plane functionality (e.g., call origination, call termination, location registration, and/or the like) and possibly some user plane functionality (e.g., exchange of data traffic), while the non-anchor carrier primarily supports user plane functionality. In one particular example of an NSA mode of operation, the anchor carrier is an LTE carrier and the non-anchor carrier is an NR carrier (e.g., a millimeter wave (mmW) carrier, a sub-6 GHz carrier and/or the like). This LTE+NR NSA mode of operation is referred to as an Evolved Universal Mobile Telecommunications System Terrestrial Radio Access (E-UTRA)-NR dual connectivity (ENDC) mode of operation. In another example of an NSA mode of operation, the anchor carrier can be an NR carrier and the non-anchor carrier can be an LTE carrier. In yet another example of the NSA mode of operation, the anchor carrier can be a first LTE carrier and the non-anchor carrier can be a second LTE carrier. In still another example of the NSA mode of operation, the anchor carrier can be a first NR carrier and the non-anchor carrier can be a second NR carrier. Notably, the above examples are provided for illustrative purposes and, in practice, a UE may be configured for another type of NSA mode of operation (e.g., an NSA mode of operation associated with a RAT other than LTE and NR).

Another particular example of a dual carrier mode of operation is a so-called dual subscriber identity module dual active (DSDA) mode of operation. For example, some UEs can be equipped with dual subscriber identity module (SIM) cards, each storing respective international mobile subscriber identity (IMSI) numbers and keys associated with providing identification and authentication of the UE. In the DSDA mode of operation, such a UE may be permitted to communicate using both SIMS simultaneously on two different carriers. Here, the two carriers can be associated with the same RAT or different RATs.

Generally, in a dual carrier mode of operation, one carrier has priority over the other carrier (e.g., in terms of access to UE resources). For example, in an NSA mode of operation, the anchor carrier has priority over the non-anchor carrier with respect to receive chain selection, transmit antenna selection, antenna switching decisions, uplink power sharing, and/or the like. As a particular example, a UE may have multiple antennas (e.g., two antennas, four antennas, eight antennas, or the like) and may be configured to operate in the ENDC mode of operation (i.e., an NSA mode of operation in which the anchor carrier is an LTE carrier and the non-anchor carrier is an NR carrier, such as a sub-6 GHz carrier). In the ENDC mode of operation, the UE may be permitted to use all of the antennas for receiving communications on the anchor carrier and for receiving communications on the non-anchor carrier. However, the UE may be permitted to use only a particular one of the multiple antennas for transmitting communications on given carrier. To identify which antenna is to be used by the anchor carrier (before a link associated with the non-anchor carrier is established), the UE may observe channel conditions associated with the antennas. The UE then identifies the best available antenna (e.g., the antenna with the most favorable channel conditions), and allocates an antenna port associated with the best available antenna to the anchor carrier (where a given antenna port corresponds to a particular transmit antenna since the UE may receive communications on all of the antennas). Upon establishing a link associated with the non-anchor carrier (e.g., at a later time) the UE may identify which antenna is to be used by the non-anchor carrier. Here, the UE may observe channel conditions associated with the available antennas or use the previously observed channel conditions. The UE then identifies the best remaining available antenna (e.g., the available antenna with the most favorable channel conditions), and allocates an antenna port associated with the best remaining available antenna to the non-anchor carrier. In this shared multi-antenna scenario, the anchor carrier is allocated an antenna port associated with a best available antenna, and the non-anchor NR carrier is allocated an antenna port associated with the next-best available antenna. Notably, the number of antennas that are available for receiving or transmitting on a given carrier may in some cases be limited based on whether the carrier is a low-band carrier, a mid-band carrier, or a high-band carrier.

Maximum transmit power limits (MTPLs) can vary among antennas of a UE due to losses related to a hardware design of the UE, such as insertion losses, trace losses, and/or the like. This variation in MTPLs can impact performance of the dual carrier mode of operation. For example, in a scenario in which an ENDC UE has antennas 1, 2, 3, and 4, the UE may observe channel conditions that indicate that antenna 1 (corresponding to antenna port A) is a best available antenna, and that antenna 2 (corresponding to antenna port B) is next-best available antenna. Following the example described above, antenna port A would be allocated to the LTE carrier (i.e., the anchor carrier) and antenna port B would be allocated to the NR carrier (i.e., the non-anchor carrier) since the LTE carrier effectively has priority over the NR carrier in terms of antenna port selection. In this scenario, assume that antenna 1 has a higher MTPL (e.g., 25 decibel-milliwatts (dBm)) than antenna 2 (e.g., 22 dBm).

In such a situation, giving priority to the LTE carrier over the NR may hinder performance. For example, because a significant portion of data traffic may use the NR carrier, there may be a large number of grants on the NR carrier, but no grants or few grants on the LTE carrier. Further, due to the nature of NR frequencies, the NR carrier may be experience comparatively higher pathloss than the LTE carrier. One option to overcome the pathloss on the NR carrier is to increase a transmit power on the NR carrier. However, because the LTE carrier had higher priority in terms of antenna port selection (e.g., since the LTE carrier was allocated antenna port A), the NR carrier is forced to use the second best transmit antenna (corresponding to antenna port B), meaning that transmit power on the NR carrier is limited (e.g., as compared to an allowable transmit power on the LTE carrier), which inhibits performance on the NR carrier. Additionally, because there are no grants or few grants on the LTE carrier and pathloss on the LTE carrier is comparatively lower, the LTE carrier may be able to use the second best antenna port without any impact on service. That is, the best transmit antenna (corresponding to antenna port A) is not necessarily needed for supporting communications on the LTE carrier. Rather, the best transmit antenna may be better utilized by the NR carrier.

Some aspects described herein provide techniques and apparatuses for uplink performance optimization in dual carrier operation. In some aspects, a UE may communicate on a primary carrier (e.g., an anchor carrier) using a first antenna port (e.g., corresponding to a best available transmit antenna) and may communicate on a secondary carrier (e.g., a non-anchor carrier) using a second antenna port (e.g., corresponding to a next-best available transmit antenna). In some aspects, the UE may determine whether to switch the secondary carrier from the second antenna port to the first antenna port based on a channel condition associated with the second antenna port, and may switch the secondary carrier from the second antenna port to the first antenna port, accordingly. As described in further detail below, in some aspects, the UE may determine that the channel condition associated with the second antenna port satisfies a threshold (e.g., a threshold associated with determining whether the primary carrier can maintain a link on the second antenna port), and can trigger the antenna switch accordingly.

In this way, the secondary carrier (e.g., a carrier with a comparatively high allocation or transit power requirement) may be permitted to use the best available antenna, thereby allowing the secondary carrier to be allocated to an antenna port that allows for transmission at a higher transmit power, while avoiding performance impact on the primary carrier. This improves overall performance associated with the UE, achievable throughput, and call sustainability when operating in a dual carrier mode.

Figure 3A:
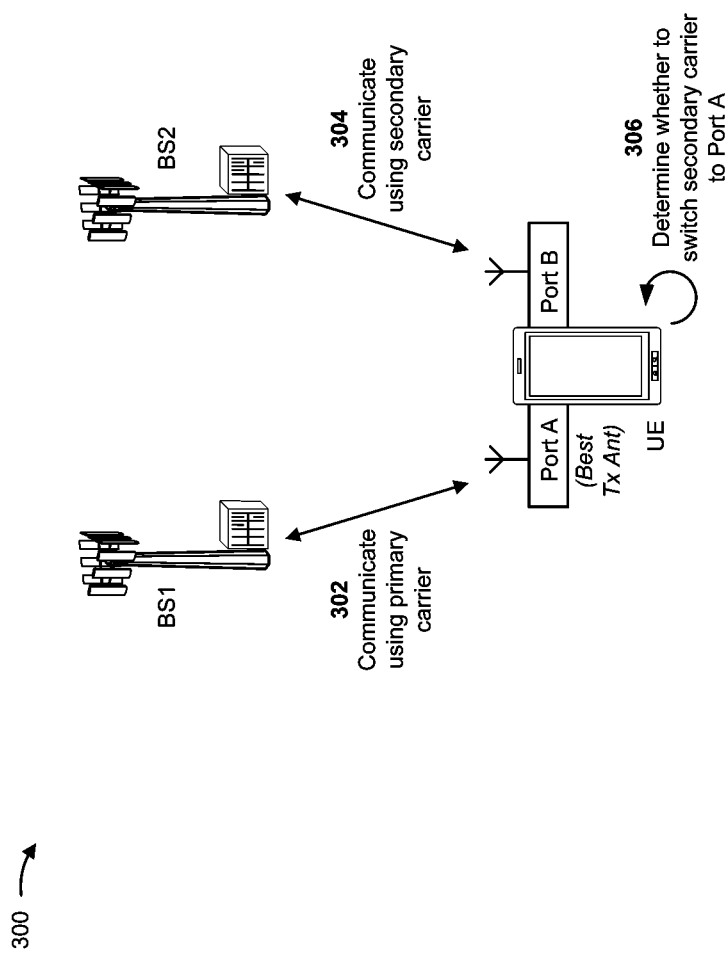
FIGS. 3A and 3B are diagrams illustrating an example associated with uplink performance optimization in dual carrier operation, in accordance with various aspects of the present disclosure.
Figure 3B:
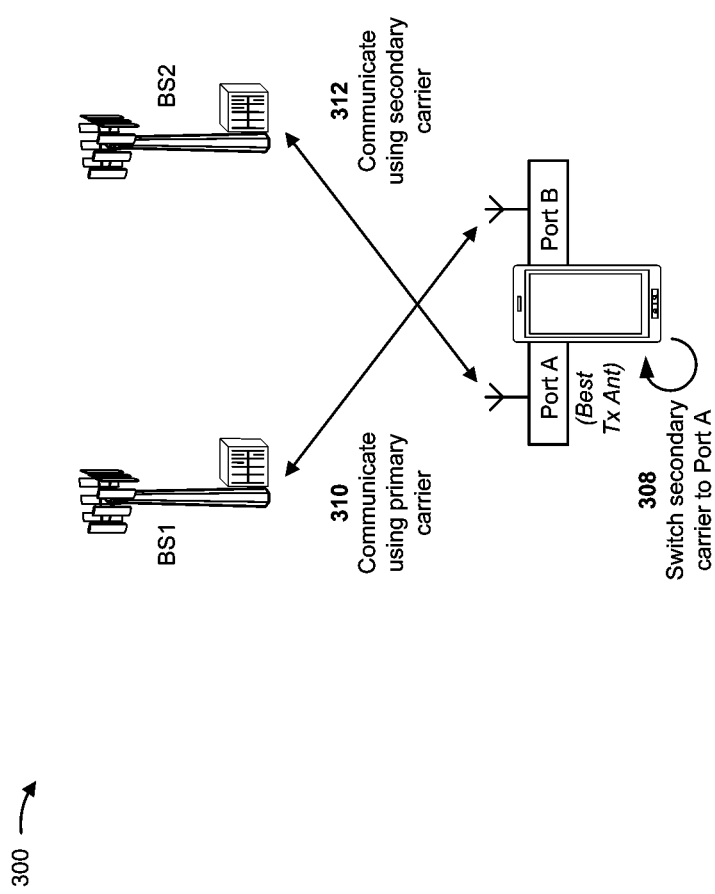

FIGS. 3A and 3B are diagrams illustrating an example 300 associated with uplink performance optimization in dual carrier operation, in accordance with various aspects of the present disclosure. As shown in FIGS. 3A and 3B, example 300 includes communication between a UE (e.g., a UE 120), a first base station (e.g., a first BS 110, identified as BS1), and a second base station (e.g., a second BS 110, identified as BS2). In some aspects, the first and second base stations may be associated with a same RAT (e.g., LTE, NR, and/or the like) or different RATs. In some aspects, the UE, the first base station, and the second base station may be included in a wireless network, such as wireless network 100. The first and second base stations and the UE may communicate on first and second wireless access links, respectively, each of which may include an uplink and a downlink.

As shown by reference 302, the UE may communicate (e.g., with the first base station) on a primary carrier using a first antenna port. Here, the first antenna port corresponds to a first transmit antenna of the UE. The first antenna port is identified in example 300 as Port A. Similarly, as shown by reference 304, the UE may communicate (e.g., with the second base station) on a secondary carrier using a second antenna port. Here, the second antenna port corresponds to a second transmit antenna of the UE. The second antenna port is identified in example 300 as Port B.

In some aspects, the UE may be operating in an NSA mode of operation. For example, the UE may be operating in the ENDC mode of operation. When the UE is operating in the NSA mode, the primary carrier is the anchor carrier and the secondary carrier is the non-anchor carrier. Alternatively, in some aspects, the UE may be a dual SIM UE operating in a DSDA mode of operation that allows the UE to communicate using two different carriers.

In some aspects, the primary carrier and the secondary carrier are associated with different RATs. For example, the primary carrier may be an LTE carrier and the secondary carrier may be an NR carrier (e.g., when the UE is operating in an ENDC mode of operation). As another example, the primary carrier may be an NR carrier and the secondary carrier may be an LTE carrier. In some aspects, the primary carrier and the secondary carrier are associated with the same RAT. For example, the primary carrier may be a first LTE carrier and the secondary carrier may be a second LTE carrier. As another example, the primary carrier may be a first NR carrier and the secondary carrier may be a second NR carrier.

In some aspects, the UE begins communicating on the secondary carrier after the UE begins communicating on the primary carrier. For example, a link that uses the primary carrier may be established between the UE and the first base station. In association with establishing the link that uses the primary carrier, the UE may identify the first transmit antenna as a best available antenna, and may allocate the first antenna port (Port A, which corresponds to the first transmit antenna) to the primary carrier. Thus, the antenna port associated with the best available antenna is allocated to the primary carrier. Continuing with this example, a link that uses the secondary carrier is established between the UE and the second base station after establishment of the link that uses the primary carrier. In association with establishing the link that uses the secondary carrier, the UE may identify the second transmit antenna as a best remaining available antenna, and may allocate the second antenna port (Port B, which corresponds to the second transmit antenna) to the secondary carrier.

In some aspects, the link that uses the secondary carrier may be established when the UE begins operation in the NSA mode. For example, when the UE is an ENDC UE, the UE may first establish a link associated with an LTE carrier. Here, upon detecting a trigger to commence operation in the ENDC mode, the UE may establish a link using an NR carrier.

Notably, in the scenario illustrated by references 302 and 304, the primary carrier (e.g., the anchor carrier) is allocated the antenna port associated with the best available antenna and the secondary carrier (e.g., the non-anchor carrier) is allocated the antenna port associated with the best remaining available antenna.

In some aspects, as shown by reference 306, the UE may determine whether to switch the secondary carrier from the second antenna port (Port B) to the first antenna port (Port A). In some aspects, the UE may determine whether to switch the secondary carrier from the second antenna port to the first antenna port based on a channel condition associated with the second antenna port. For example, in an NSA mode of operation, the UE may determine whether to switch the non-anchor carrier from the second antenna port to the first antenna port.

In some aspects, the determination of whether to switch the secondary carrier to the first antenna port is based at least in part on a determination of whether the primary carrier can maintain a link on the second antenna port. Thus, in some aspects, the determination of whether to switch the secondary carrier is based at least in part on whether a channel condition on the second antenna port indicates that the second antenna port would provide adequate support for communications on the primary carrier. That is, in some aspects, the UE may determine whether the primary carrier can maintain a link on the second antenna port based on a channel condition associated with the second antenna port. In some aspects, the channel condition associated with the second antenna port may be based on one or more metrics associated with the second antenna port. The one or more metrics may include, for example, a block error rate (BLER) associated with the second antenna port, a received signal strength indicator (RSSI) associated with the second antenna port, a signal-to-noise ratio (SNR) associated with the second antenna port, and/or another metric indicative of a channel condition at the second antenna port. In some aspects, the channel condition may be a result of applying a function to the one or more metrics.

In some aspects, the UE may determine whether to switch the secondary carrier from the second antenna port to the first antenna port by determining whether the channel condition associated with the second antenna port satisfies a threshold for communicating on the primary carrier. The threshold for communicating on the primary carrier may be a threshold associated with determining whether the primary carrier can maintain a link on the second antenna port. In some aspects, the threshold is associated with one or more metrics associated with the second antenna port. For example, the threshold may include a BLER threshold (e.g., a 5% BLER), an RSSI threshold (e.g., a −80 dBm RSSI), an SNR threshold (e.g., a 5 dBm SNR), and/or a threshold for a function that operates based on a BLER, an RSSI, an SNR, and/or one or more other metrics.

In some aspects, the UE may determine the one or more metrics associated with the second antenna port (e.g., by performing one or more measurements associated with the antennas of the UE), and may determine the channel condition associated with the second antenna port based at least in part on the one or more metrics. The UE may then determine whether the channel condition associated with the second antenna port satisfies the threshold. Here, if the UE determines that the channel condition associated with the second antenna port satisfies the threshold (e.g., that the channel condition indicates that the second antenna port can support a link on the primary carrier), then the UE may determine that the secondary carrier is to be switched from the second antenna port to the first antenna port. Conversely, if the UE determines that the channel condition associated with the second antenna port does not satisfy the threshold (e.g., that the channel condition indicates that the second antenna port cannot support a link on the primary carrier), then the UE may determine that the secondary carrier is not to be switched from the second antenna port to the first antenna port.

In some aspects, the UE may determine whether to switch the secondary carrier from the second antenna port to the first antenna port further based on a UE benefit associated with a switch of the secondary carrier from the second antenna port to the first antenna port. That is, in some aspects, the UE may determine whether to switch the secondary carrier from the second antenna port to the first antenna port based on whether a benefit would be provided to the UE by a switch of the secondary carrier from the second antenna port to the first antenna port. The UE benefit may be associated with, for example, improving transmit power, increasing throughput, improving call sustainability, and/or the like.

In some aspects, the UE may determine a degree of UE benefit (e.g., an improvement to transmit power, an increase to throughput, an improvement to call sustainability, and/or the like) based on a parameter (e.g., an MTPL, a power headroom, and/or the like) of the second antenna port, a parameter of the first antenna port, a channel condition associated with the second antenna port, and/or a channel condition associated with the first antenna port.

For example, the UE may determine an improvement to transmit power associated with the secondary carrier based on an MTPL associated with the second antenna port and an MTPL associated with the first antenna port. Here, if the UE determines that the degree of UE benefit (i.e., the improvement to transmit power) satisfies a transmit power improvement threshold (e.g., a threshold indicating a minimum improvement to MTPL needed to permit a switch of the secondary carrier from the second antenna port to the first antenna port), then the UE may determine that the secondary carrier is to be switched from the second antenna port to the first antenna port. Conversely, if the UE determines that the degree of UE benefit does not satisfy the transmit power improvement threshold, then the UE may determine that the secondary carrier is not to be switched from the second antenna port to the first antenna port.

As another example, the UE may determine a difference between a channel condition associated with the first antenna port and a channel condition associated with the second antenna port, and may derive a degree of UE benefit (e.g., an improvement in the channel condition) based at least in part on the difference. Here, if the UE determines that the degree of UE benefit satisfies a channel condition improvement threshold (e.g., a threshold indicating a minimum improvement to the channel condition needed to permit a switch of the secondary carrier from the second antenna port to the first antenna port), then the UE may determine that the secondary carrier is to be switched from the second antenna port to the first antenna port. Conversely, if the UE determines that the degree of UE benefit does not satisfy the channel condition improvement threshold, then the UE may determine that the secondary carrier is not to be switched from the second antenna port to the first antenna port.

In some aspects, the UE may determine whether to switch the secondary carrier from the second antenna port to the first antenna port further based at least in part on information associated with resource allocations for the primary carrier and information associated with resource allocations for the secondary carrier. That is, in some aspects, the UE may determine whether to switch the secondary carrier from the second antenna port to the first antenna port based on information associated with data traffic on the primary and secondary carriers. The information associated with the data traffic can include, for example, information indicating a number or a regularity of resource block (RB) allocations on the primary and secondary carriers (e.g., on the uplink and/or on the downlink).

As a particular example, the UE may identify a number of RB allocations on the secondary carrier in a particular time window. Here, if the UE determines that the number of RB allocations on the secondary carrier satisfies a threshold number of RB allocations for the secondary carrier (e.g., that the number of RB allocations on the secondary carrier is greater than a particular number of RB allocations), then the UE may determine that the secondary carrier is to be switched from the second antenna port to the first antenna port. Conversely, if the UE determines that the number or RB allocations on the secondary carrier does not satisfy the threshold associated with the secondary carrier, then the UE may determine that the secondary carrier is not to be switched from the second antenna port to the first antenna port.

As another particular example, the UE may identify a number of RB allocations on the primary carrier in a particular time window. Here, if the UE determines that the number of RB allocations on the primary carrier satisfies a threshold number of RB allocations for the primary carrier (e.g., that the number of RB allocations on the primary carrier is less than or equal to a particular number of RB allocations), then the UE may determine that the secondary carrier is to be switched from the second antenna port to the first antenna port. Conversely, if the UE determines that the number or RB allocations on the primary carrier does not satisfy the threshold associated with the primary carrier, then the UE may determine that the secondary carrier is not to be switched from the second antenna port to the first antenna port.

As still another particular example, the UE may identify a number of RB allocations on the primary carrier within a particular time window and may identify a number of RB allocations on the secondary carrier within the particular time window. Here, if the UE determines that the number of RB allocations on the secondary carrier is greater than the number of RB allocations on the primary carrier (e.g., by a particular number of RB allocations), then the UE may determine that the secondary carrier is to be switched from the second antenna port to the first antenna port. Conversely, if the UE determines that the number or RB allocations on the primary carrier is not greater than number of RB allocations on the primary carrier, then the UE may determine that the secondary carrier is not to be switched from the second antenna port to the first antenna port.

In example 300, the UE determines that the secondary carrier is to be switched from the second antenna port to the first antenna port. Thus, as shown in FIG. 3B by reference 308, the UE may switch the secondary carrier from the second antenna port to the first antenna port based on the determination to switch the secondary carrier from the second antenna port to the first antenna port. In some aspects, the UE switches the primary carrier from the first antenna port to the second antenna port based on the determination to switch the secondary carrier from the second antenna port to the first antenna port. For example, as shown in FIG. 3B, the UE switches the secondary carrier from Port B to Port A, and switches the primary carrier from Port A to Port B.

As shown by reference 310, after switching the secondary carrier from the second antenna port to the first antenna port, the UE may communicate (e.g., with the second base station) on the secondary carrier using the first antenna port. Similarly, as shown by reference 312, after switching the primary carrier from the first antenna port to the second antenna port, the UE may communicate (e.g., with the first base station) on the primary carrier using the second antenna port.

In this way, the secondary carrier may be permitted to use the best available antenna (in example 300 this is the first transmit antenna associated with Port A), thereby allowing the secondary carrier to be allocated to the antenna port that allows for transmission at a higher transmit power, while avoiding performance impact on the primary carrier. As a result, overall performance associated with the UE, achievable throughput, and call sustainability of the UE may be improved when the UE is operating in a dual carrier mode (e.g., an NSA mode such as ENDC, a DSDA mode, and/or the like).

In some aspects, the UE may determine whether to switch the secondary carrier from the first antenna port (back) to the second antenna port after the switching of the secondary carrier from the second antenna port to the first antenna port. In some aspects, the UE may determine whether to switch the secondary carrier back from the first antenna port to the second antenna port based on another channel condition associated with the second antenna port. For example, the UE may determine whether to switch the secondary carrier back from the first antenna port to the second antenna port based on a channel condition associated with the second antenna port that is observed by the UE after the UE switches the secondary carrier from the second antenna port the first antenna port.

In some aspects, the determination of whether to switch the secondary carrier back to the second antenna port is based at least in part on a determination of whether the primary carrier can continue to maintain a link on the second antenna port. Thus, in some aspects, the determination of whether to switch the secondary carrier back is based at least in part on whether another channel condition on the second antenna port indicates that the second antenna port would continue to provide adequate support for communications on the primary carrier. In some aspects, the other channel condition associated with the second antenna port may be based on one or more metrics associated with the second antenna port, as described above. In some aspects, the UE may determine whether to switch the secondary carrier back from the first antenna port to the second antenna port by determining whether the other channel condition associated with the second antenna port satisfies the threshold for communicating on the primary carrier, as described above. In some aspects, based on a determination to switch the secondary carrier back from the first antenna port to the second antenna port, the UE may switch the secondary carrier from the first antenna port to the second antenna port, and may switch the primary carrier from the second antenna port to the first antenna port.

In some aspects, the determination of whether to switch the secondary carrier from the first antenna port to the second antenna port is triggered based on expiration of a timer. For example, the UE may start a timer (e.g., a 100 millisecond timer) upon switching the secondary carrier from the second antenna port to the first antenna port and, upon expiration of the timer, may determine whether to switch the secondary carrier back from the first antenna port to the second antenna port. Here, if the UE determines that the UE is not to switch the secondary carrier from the first antenna port to the second antenna port, the UE may restart the timer. In this way, the UE may be configured to re-evaluate a switch of the secondary carrier from the second antenna port to the first antenna port on a periodic basis.

In some aspects, the determination of whether to switch the secondary carrier from the first antenna port to the second antenna port is triggered based on a detection of an event. For example, the UE may detect an event and, upon detection of the event, may determine whether to switch the secondary carrier from the first antenna port to the second antenna port. The event may include, for example, a movement of the UE from a cell in which the primary carrier is associated with a first RAT (e.g., LTE) to a cell in which the primary carrier is associated with a second RAT (e.g., NR), a change in a mode of operation of the UE (e.g., from ENDC to a standalone mode on NR), a handover of the primary carrier to another cell, or another type of event.

As indicated above, FIGS. 3A and 3B are provided as examples. Other examples may differ from what is described with respect to FIGS. 3A and 3B.

Figure 4:
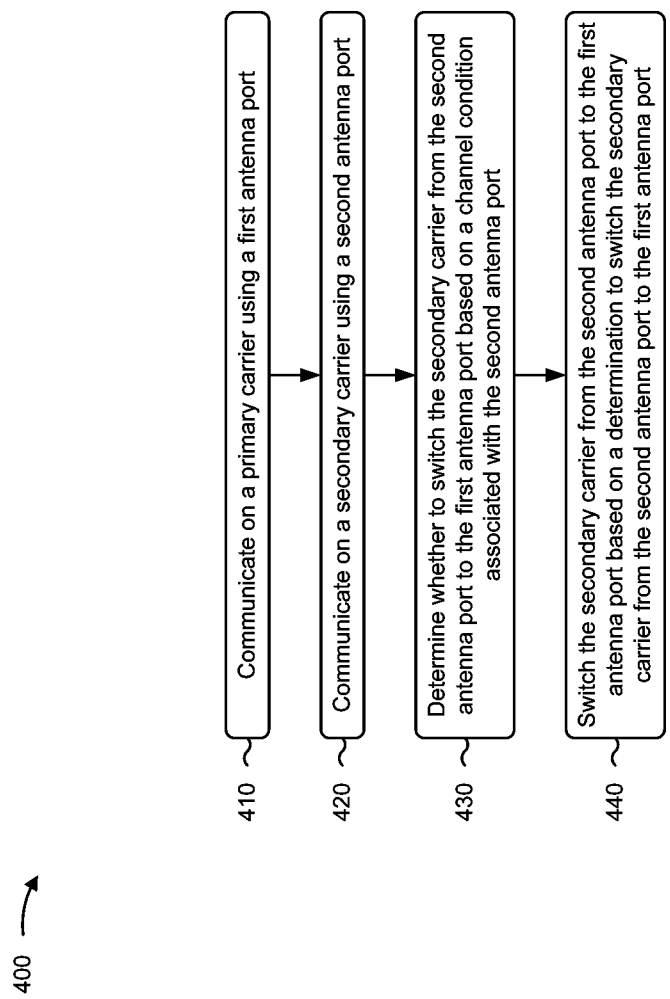
FIG. 4 is a diagram illustrating an example process associated with uplink performance optimization in dual carrier operation, in accordance with various aspects of the present disclosure.

FIG. 4 is a diagram illustrating an example process 400 performed, for example, by a user UE, in accordance with various aspects of the present disclosure. Example process 400 is an example where the UE (e.g., UE 120) performs operations associated with uplink performance optimization in dual carrier operation.

As shown in FIG. 4, in some aspects, process 400 may include communicating on a primary carrier using a first antenna port (block 410). For example, the UE (e.g., using antenna 252, demodulator 254, MIMO detector 256, receive processor 258, transmit processor 264, TX MIMO processor 266, modulator 254, controller/processor 280, and/or memory 282) may communicate on a primary carrier using a first antenna port, as described above. In some aspects, the operation of block 410 may be performed by communication component 508 of FIG. 5.

As further shown in FIG. 4, in some aspects, process 400 may include communicating on a secondary carrier using a second antenna port (block 420). For example, the UE (e.g., using antenna 252, demodulator 254, MIMO detector 256, receive processor 258, transmit processor 264, TX MIMO processor 266, modulator 254, controller/processor 280, and/or memory 282) may communicate on a secondary carrier using a second antenna port, as described above. In some aspects, the operation of block 420 may be performed by communication component 508 of FIG. 5.

As further shown in FIG. 4, in some aspects, process 400 may include determining whether to switch the secondary carrier from the second antenna port to the first antenna port based on a channel condition associated with the second antenna port (block 430). For example, the UE (e.g., using antenna 252, demodulator 254, MIMO detector 256, receive processor 258, transmit processor 264, TX MIMO processor 266, modulator 254, controller/processor 280, and/or memory 282) may determine whether to switch the secondary carrier from the second antenna port to the first antenna port based on a channel condition associated with the second antenna port, as described above. In some aspects, the operation of block 430 may be performed by determination component 510 of FIG. 5.

As further shown in FIG. 4, in some aspects, process 400 may include switching the secondary carrier from the second antenna port to the first antenna port based on a determination to switch the secondary carrier from the second antenna port to the first antenna port (block 440). For example, the UE (e.g., using antenna 252, demodulator 254, MIMO detector 256, receive processor 258, transmit processor 264, TX MIMO processor 266, modulator 254, controller/processor 280, and/or memory 282) may switch the secondary carrier from the second antenna port to the first antenna port based on a determination to switch the secondary carrier from the second antenna port to the first antenna port, as described above. In some aspects, the operation of block 440 may be performed by switching component 512 of FIG. 5.

Process 400 may include additional aspects, such as any single aspect or any combination of aspects described below and/or in connection with one or more other processes described elsewhere herein.

In a first aspect, process 400 includes switching the primary carrier from the first antenna port to the second antenna port based on the determination to switch the secondary carrier from the second antenna port to the first antenna port.

In a second aspect, alone or in combination with the first aspect, the determination of whether to switch the secondary carrier from the second antenna port to the first antenna port comprises determining that the channel condition associated with the second antenna port satisfies a threshold for communicating using the primary carrier, and determining whether to switch the secondary carrier from the second antenna port to the first antenna port based on the determination that the channel condition associated with the second antenna port satisfies the threshold for communicating using the primary carrier.

In a third aspect, alone or in combination with one or more of the first and second aspects, the threshold is associated with at least one of a block error rate associated with the second antenna port, a received signal strength indicator associated with the second antenna port, or a signal-to-noise ratio associated with the second antenna port.

In a fourth aspect, alone or in combination with one or more of the first through third aspects, the determination of whether to switch the secondary carrier from the second antenna port to the first antenna port is further based on a UE benefit associated with a switch of the secondary carrier from the second antenna port to the first antenna port.

In a fifth aspect, alone or in combination with one or more of the first through fourth aspects, the UE benefit is associated with at least one of improving transmit power, increasing throughput, or improving call sustainability.

In a sixth aspect, alone or in combination with one or more of the first through fifth aspects, the determination of whether to switch the secondary carrier from the second antenna port to the first antenna port is further based on information associated with resource allocations for the primary carrier and information associated with resource allocations for the secondary carrier.

In a seventh aspect, alone or in combination with one or more of the first through sixth aspects, process 400 includes determining, after the switching of the secondary carrier from the second antenna port to the first antenna port, whether to switch the secondary carrier from the first antenna port to the second antenna port based on another channel condition associated with the second antenna port, and switching the secondary carrier from the first antenna port to the second antenna port based on a determination to switch the secondary carrier from the first antenna port to the first antenna port.

In an eighth aspect, alone or in combination with one or more of the first through seventh aspects, process 400 includes switching the primary carrier from the second antenna port to the first antenna port based on the determination to switch the secondary carrier from the first antenna port to the second antenna port.

In a ninth aspect, alone or in combination with one or more of the first through eighth aspects, the determination of whether to switch the secondary carrier from the first antenna port to the second antenna port based on the other channel condition comprises determining that the other channel condition associated with the second antenna port fails to satisfy a threshold for communicating using the primary carrier, and determining to switch the secondary carrier from the first antenna port to the second antenna port based on the determination that the other channel condition associated with the second antenna port fails to satisfy the threshold for communicating using the primary carrier.

In a tenth aspect, alone or in combination with one or more of the first through ninth aspects, the determination of whether to switch the secondary carrier from the first antenna port to the second antenna port is triggered based on expiration of a timer.

In an eleventh aspect, alone or in combination with one or more of the first through tenth aspects, the determination of whether to switch the secondary carrier from the first antenna port to the second antenna port is triggered based on a detection of an event.

In a twelfth aspect, alone or in combination with one or more of the first through eleventh aspects, the UE is operating in a DC mode, the primary carrier is an anchor carrier associated with the DC mode, and the secondary carrier is a non-anchor carrier associated with the DC mode.

In a thirteenth aspect, alone or in combination with one or more of the first through twelfth aspects, the primary carrier is an LTE carrier and the secondary carrier is an NR carrier.

In a fourteenth aspect, alone or in combination with one or more of the first through thirteenth aspects, the UE is operating in a dual SIM dual active mode, the primary carrier is associated with a first SIM, and the secondary carrier is associated with a second SIM.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
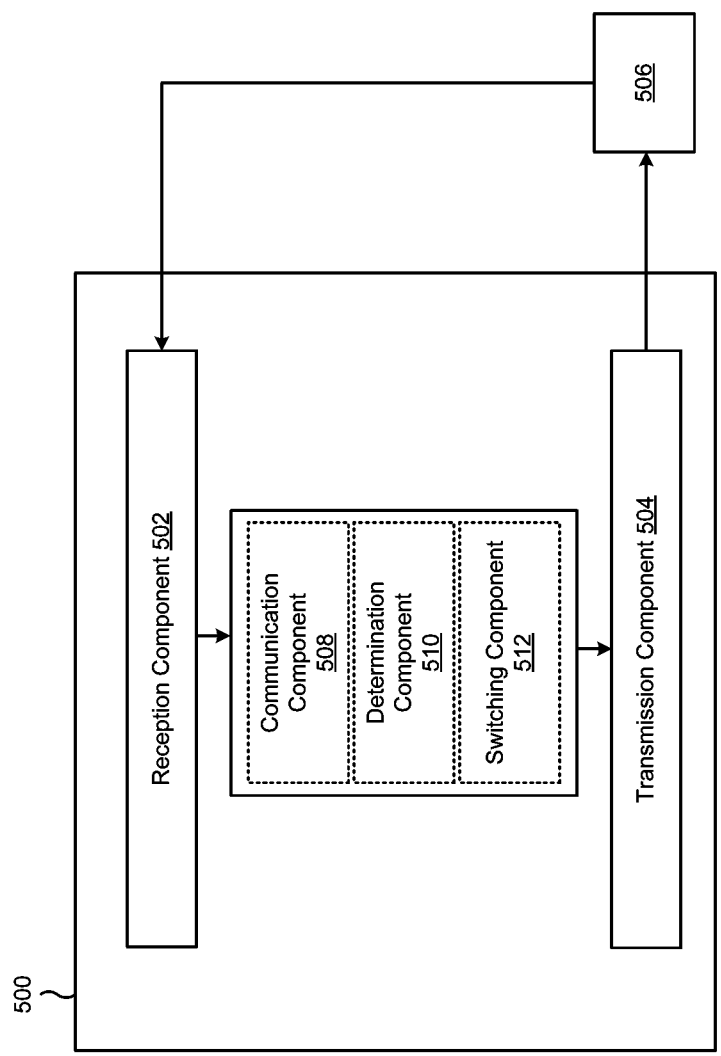
FIG. 5 is a block diagram of an example apparatus for wireless communication, in accordance with various aspects of the present disclosure.

FIG. 5 is a block diagram of an example apparatus 500 for wireless communication. The apparatus 500 may be a UE (e.g., a UE 120), or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include one or more of a communication component 508, a determination component 510, or a switching component 512, among other examples.

In some aspects, the apparatus 500 may be configured to perform one or more operations described herein in connection with FIGS. 3A-3B. Additionally or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The communication component 508 may communicate on a primary carrier using a first antenna port. The communication component 508 may communicate on a secondary carrier using a second antenna port.

The determination component 510 may determine whether to switch the secondary carrier from the second antenna port to the first antenna port based on a channel condition associated with the second antenna port. The determination component 510 may determine that the channel condition associated with the second antenna port satisfies a threshold for communicating using the primary carrier, and determine whether to switch the secondary carrier from the second antenna port to the first antenna port based on the determination that the channel condition associated with the second antenna port satisfies the threshold for communicating using the primary carrier. The determination component 510 may determine, after a switching of the secondary carrier from the second antenna port to the first antenna port, whether to switch the secondary carrier from the first antenna port to the second antenna port based on another channel condition associated with the second antenna port. The determination component 510 may determine that the other channel condition associated with the second antenna port fails to satisfy a threshold for communicating using the primary carrier, and determine to switch the secondary carrier from the first antenna port to the second antenna port based on the determination that the other channel condition associated with the second antenna port fails to satisfy the threshold for communicating using the primary carrier.

The switching component 512 may switch the secondary carrier from the second antenna port to the first antenna port based on a determination to switch the secondary carrier from the second antenna port to the first antenna port. The switching component 512 may switch the primary carrier from the first antenna port to the second antenna port based on the determination to switch the secondary carrier from the second antenna port to the first antenna port. The switching component 512 may switch the secondary carrier from the first antenna port to the second antenna port based on a determination to switch the secondary carrier from the first antenna port to the first antenna port. The switching component 512 may switch the primary carrier from the second antenna port to the first antenna port based on the determination to switch the secondary carrier from the first antenna port to the second antenna port.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of (one or more) components shown in FIG. 5 may perform one or more functions described as being performed by another set of components shown in FIG. 5.

Figure 6:
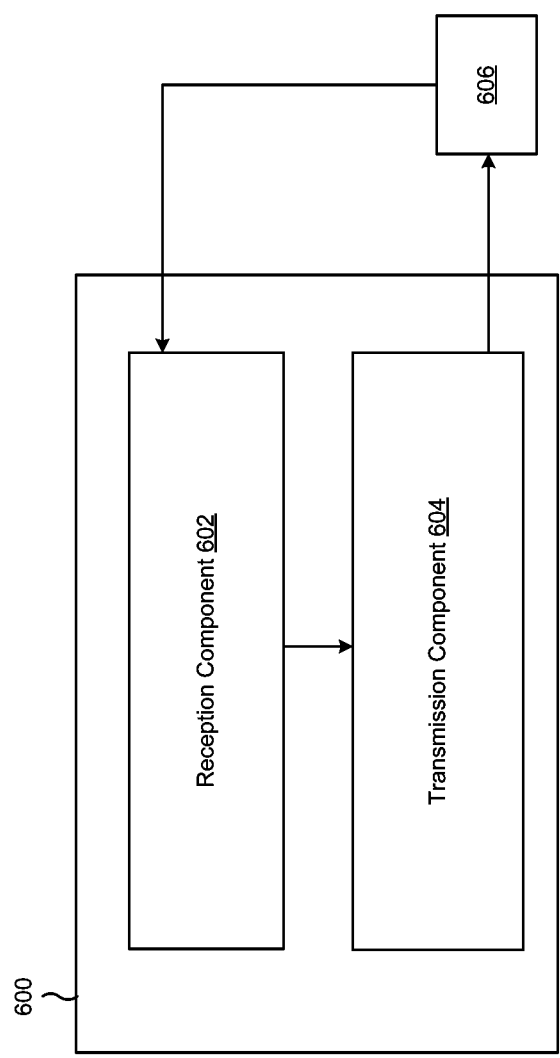
FIG. 6 is a block diagram of an example apparatus for wireless communication, in accordance with various aspects of the present disclosure.

FIG. 6 is a block diagram of an example apparatus 600 for wireless communication. The apparatus 600 may be a base station (e.g., a base station 110), or a base station may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604.

In some aspects, the apparatus 600 may be configured to perform one or more operations described herein in connection with FIGS. 3A and 3B. Additionally or alternatively, the apparatus 600 may be configured to perform one or more processes described herein. In some aspects, the apparatus 600 and/or one or more components shown in FIG. 6 may include one or more components of the base station described above in connection with FIG. 2. Additionally, or alternatively, one or more components shown in FIG. 6 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the base station described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the base station described above in connection with FIG. 2. In some aspects, the transmission component 604 may be co-located with the reception component 602 in a transceiver.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

The following provides an overview of some aspects of the present disclosure:

Aspect 1: A method of wireless communication performed by a user equipment (UE), comprising: communicating on a primary carrier using a first antenna port;

communicating on a secondary carrier using a second antenna port; determining whether to switch the secondary carrier from the second antenna port to the first antenna port based on a channel condition associated with the second antenna port; and switching the secondary carrier from the second antenna port to the first antenna port based on a determination to switch the secondary carrier from the second antenna port to the first antenna port.

Aspect 2: The method of aspect 1, further comprising: switching the primary carrier from the first antenna port to the second antenna port based on the determination to switch the secondary carrier from the second antenna port to the first antenna port.

Aspect 3: The method of any of aspects 1-2, wherein the determination whether to switch the secondary carrier from the second antenna port to the first antenna port comprises: determining that the channel condition associated with the second antenna port satisfies a threshold for communicating using the primary carrier, and determining whether to switch the secondary carrier from the second antenna port to the first antenna port based on the determination that the channel condition associated with the second antenna port satisfies the threshold for communicating using the primary carrier.

Aspect 4: The method of aspect 3, wherein the threshold is associated with at least one of: a block error rate associated with the second antenna port, a received signal strength indicator associated with the second antenna port, or a signal-to-noise ratio associated with the second antenna port.

Aspect 5: The method of any of aspects 1-4, wherein the determination of whether to switch the secondary carrier from the second antenna port to the first antenna port is further based on a UE benefit associated with a switch of the secondary carrier from the second antenna port to the first antenna port.

Aspect 6: The method of aspect 5, wherein the UE benefit is associated with at least one of improving transmit power, increasing throughput, or improving call sustainability.

Aspect 7: The method of any of aspects 1-6, wherein the determination of whether to switch the secondary carrier from the second antenna port to the first antenna port is further based on information associated with resource allocations for the primary carrier and information associated with resource allocations for the secondary carrier.

Aspect 8: The method of any of aspects 1-7, further comprising: determining, after the switching of the secondary carrier from the second antenna port to the first antenna port, whether to switch the secondary carrier from the first antenna port to the second antenna port based on another channel condition associated with the second antenna port, and switching the secondary carrier from the first antenna port to the second antenna port based on a determination to switch the secondary carrier from the first antenna port to the first antenna port.

Aspect 9: The method of aspect 8, further comprising: switching the primary carrier from the second antenna port to the first antenna port based on the determination to switch the secondary carrier from the first antenna port to the second antenna port.

Aspect 10: The method of any of aspects 8-9, wherein the determination of whether to switch the secondary carrier from the first antenna port to the second antenna port based on the other channel condition comprises: determining that the other channel condition associated with the second antenna port fails to satisfy a threshold for communicating using the primary carrier, and determining to switch the secondary carrier from the first antenna port to the second antenna port based on the determination that the other channel condition associated with the second antenna port fails to satisfy the threshold for communicating using the primary carrier.

Aspect 11: The method of any of aspects 8-10, wherein the determination of whether to switch the secondary carrier from the first antenna port to the second antenna port is triggered based on expiration of a timer.

Aspect 12: The method of any of aspects 8-11, wherein the determination of whether to switch the secondary carrier from the first antenna port to the second antenna port is triggered based on a detection of an event.

Aspect 13: The method of any of aspects 1-12, wherein the UE is operating in a dual connectivity (DC) mode, the primary carrier is an anchor carrier associated with the DC mode, and the secondary carrier is a non-anchor carrier associated with the DC mode.

Aspect 14: The method of any of aspects 1-13, wherein the primary carrier is a Long Term Evolution (LTE) carrier and the secondary carrier is a New Radio (NR) carrier.

Aspect 15: The method of any of aspects 1-14, wherein the UE is operating in a dual subscriber identity module (SIM) dual active mode, the primary carrier is associated with a first SIM, and the secondary carrier is associated with a second SIM.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
communicating on an anchor carrier using a first antenna port of the UE;
communicating on a non-anchor carrier using a second antenna port of the UE;
determining to switch the non-anchor carrier from the second antenna port to the first antenna port based on a channel condition associated with the second antenna port and based on one or more of a first power limit associated with the first antenna port or a second power limit associated with the second antenna port, wherein the first power limit associated with the first antenna port is different from the second power limit associated with the second antenna port; and
switching the non-anchor carrier from the second antenna port to the first antenna port based on determining to switch the non-anchor carrier from the second antenna port to the first antenna port.

2. The method of claim 1, further comprising:
switching the anchor carrier from the first antenna port to the second antenna port based on determining to switch the non-anchor carrier from the second antenna port to the first antenna port.

3. The method of claim 1, wherein determining to switch the non-anchor carrier from the second antenna port to the first antenna port comprises:
determining that the channel condition associated with the second antenna port satisfies a threshold for communicating using the anchor carrier, and
determining to switch the non-anchor carrier from the second antenna port to the first antenna port based on determining that the channel condition associated with the second antenna port satisfies the threshold for communicating using the anchor carrier and based on one or more of the first power limit associated with the first antenna port or the second power limit associated with the second antenna port.

4. The method of claim 3, wherein the threshold, for communicating using the anchor carrier, is associated with at least one of:
a block error rate associated with the second antenna port,
a received signal strength indicator associated with the second antenna port, or
a signal-to-noise ratio associated with the second antenna port.

5. The method of claim 1, wherein determining to switch the non-anchor carrier from the second antenna port to the first antenna port is further based on a UE benefit associated with a switch of the non-anchor carrier from the second antenna port to the first antenna port.

6. The method of claim 5, wherein the UE benefit is associated with at least one of increasing throughput or improving call sustainability.

7. The method of claim 1, wherein determining to switch the non-anchor carrier from the second antenna port to the first antenna port is further based on information associated with resource allocations for the anchor carrier and information associated with resource allocations for the non-anchor carrier.

8. The method of claim 1, further comprising:
determining, after the switching of the non-anchor carrier from the second antenna port to the first antenna port, whether to switch the non-anchor carrier from the first antenna port to the second antenna port based on another channel condition associated with the second antenna port, and
switching the non-anchor carrier from the first antenna port to the second antenna port based on determining to switch the non-anchor carrier from the first antenna port to the second antenna port.

9. The method of claim 8, further comprising:
switching the anchor carrier from the second antenna port to the first antenna port based on determining to switch the non-anchor carrier from the first antenna port to the second antenna port.

10. The method of claim 8, wherein determining to switch the non-anchor carrier from the first antenna port to the second antenna port based on the other channel condition comprises:
determining that the other channel condition associated with the second antenna port fails to satisfy a threshold for communicating using the anchor carrier, and
determining to switch the non-anchor carrier from the first antenna port to the second antenna port based on determining that the other channel condition associated with the second antenna port fails to satisfy the threshold for communicating using the anchor carrier.

11. The method of claim 8, wherein determining to switch the non-anchor carrier from the first antenna port to the second antenna port is triggered based on expiration of a timer.

12. The method of claim 8, wherein determining to switch the non-anchor carrier from the first antenna port to the second antenna port is triggered based on a detection of an event.

13. The method of claim 1, wherein the UE is operating in a dual connectivity (DC) mode, the anchor carrier associated with the DC mode, and the non- anchor carrier associated with the DC mode.

14. The method of claim 1, wherein the anchor carrier is a Long Term Evolution (LTE) carrier and the non-anchor carrier is a New Radio (NR) carrier.

15. The method of claim 1, wherein the UE is operating in a dual subscriber identity module (SIM) dual active mode.

16. A user equipment (UE) for wireless communication, comprising:
a memory; and
one or more processors configured to:
communicate on an anchor carrier using a first antenna port of the UE;
communicate on a non-anchor carrier using a second antenna port of the UE;
determine to switch the non-anchor carrier from the second antenna port to the first antenna port based on a channel condition associated with the second antenna port and based on one or more of a first power limit associated with the first antenna port or a second power limit associated with the second antenna port, wherein the first power limit associated with the first antenna port is different from the second power limit associated with the second antenna port; and
switch the non-anchor carrier from the second antenna port to the first antenna port based on determining to switch the non-anchor carrier from the second antenna port to the first antenna port.

17. The UE of claim 16, wherein the one or more processors are further configured to:
switch the anchor carrier from the first antenna port to the second antenna port based on determining to switch the non-anchor carrier from the second antenna port to the first antenna port.

18. The UE of claim 16, wherein the one or more processors, when determining to switch the non-anchor carrier from the second antenna port to the first antenna port, are to:
determine that the channel condition associated with the second antenna port satisfies a threshold for communicating using the anchor carrier, and
determine to switch the non-anchor carrier from the second antenna port to the first antenna port based on determining that the channel condition associated with the second antenna port satisfies the threshold for communicating using the anchor carrier and based on one or more of the first power limit associated with the first antenna port or the second power limit associated with the second antenna port.

19. The UE of claim 16, wherein determining to switch the non-anchor carrier from the second antenna port to the first antenna port is further based on information associated with resource allocations for the anchor carrier and information associated with resource allocations for the non-anchor carrier.

20. A non-transitory computer-readable medium storing one or more instructions for wireless communication, the one or more instructions comprising:
one or more instructions that, when executed by one or more processors of a user equipment (UE), cause the one or more processors to:
communicate on an anchor carrier using a first antenna port of the UE;
communicate on a non-anchor carrier using a second antenna port of the UE;
determine to switch the non-anchor carrier from the second antenna port to the first antenna port based on a channel condition associated with the second antenna port and based on one or more of a first power limit associated with the first antenna port or a second power limit associated with the second antenna port, wherein the first power limit associated with the first antenna port is different from the second power limit associated with the second antenna port; and
switch the non-anchor carrier from the second antenna port to the first antenna port based on determining to switch the non-anchor carrier from the second antenna port to the first antenna port.

21. The UE of claim 16, wherein the first power limit associated with the first antenna port is a maximum transmit power limit (MTPL) associated with the first antenna port.

* * * * *